(12) United States Patent
Owen et al.

(10) Patent No.: US 11,884,391 B2
(45) Date of Patent: Jan. 30, 2024

(54) MISSION POD FOR UNATTENDED UAV OPERATIONS

(71) Applicant: ELROY AIR, INC., San Francisco, CA (US)

(72) Inventors: Colin Owen, San Francisco, CA (US); Bernard Michini, San Francisco, CA (US); David Merrill, San Francisco, CA (US); Clint Cope, San Francisco, CA (US); Sean Belardo, San Francisco, CA (US); Isaiah Jones, San Francisco, CA (US)

(73) Assignee: ELROY AIR, INC., San Francisco, CA (US)

( * ) Notice: Subject to any disclaimer, the term of this patent is extended or adjusted under 35 U.S.C. 154(b) by 403 days.

(21) Appl. No.: 17/070,037

(22) Filed: Oct. 14, 2020

(65) Prior Publication Data

US 2021/0300550 A1    Sep. 30, 2021

Related U.S. Application Data

(60) Provisional application No. 62/915,300, filed on Oct. 15, 2019, provisional application No. 62/914,810, filed on Oct. 14, 2019.

(51) Int. Cl.
*B64C 39/02* (2023.01)
*B64C 7/00* (2006.01)

(52) U.S. Cl.
CPC ............. *B64C 39/024* (2013.01); *B64C 7/00* (2013.01); *B64C 2211/00* (2013.01)

(58) Field of Classification Search
CPC ......... B64D 7/00; B64D 9/00; B64C 2211/00; B64C 1/22
See application file for complete search history.

(56) References Cited

U.S. PATENT DOCUMENTS

| 3,028,130 | A | 4/1962 | Burton |
| 5,820,075 | A | 10/1998 | Speakes |
| 5,961,071 | A | 10/1999 | Proctor |
| 8,128,026 | B2 | 3/2012 | Shelton |
| 8,579,234 | B2 | 11/2013 | Thompson |

(Continued)

OTHER PUBLICATIONS

Patent Cooperation Treaty Application No. PCT/US2018/067020, "International Preliminary Report on Patentability" Applicant Elroy Air, Inc., dated Jun. 23, 2020.

(Continued)

*Primary Examiner* — Joshua J Michener
*Assistant Examiner* — Arfan Y. Sinaki
(74) *Attorney, Agent, or Firm* — Martensen IP; Michael C. Martensen

(57) ABSTRACT

A mission pod configured to be carried by a UAV or other aerial vehicle and accompanying systems and methods to allow the unattended accomplishment of diverse mission types is described. The mission pod having means for communication between the pod and UAV, mechanisms for removably attaching the pod to, and detaching the pod from, the UAV without the intervention of ground crew, mechanisms for facilitating power, fuel, and/or data transfer between the pod and UAV, means for securing various mission components within the pod, and pod configurations supporting various sensing modalities and other mission requirements.

13 Claims, 13 Drawing Sheets

(56) References Cited

U.S. PATENT DOCUMENTS

| | | | |
|---|---|---|---|
| 9,550,567 B1 | 1/2017 | Erdozain, Jr. et al. | |
| 9,669,927 B2* | 6/2017 | Hodge | B64D 9/00 |
| 10,583,922 B1* | 3/2020 | Boyes | B64C 1/22 |
| 10,717,524 B1* | 7/2020 | Boyes | B64D 43/00 |
| 2003/0071170 A1* | 4/2003 | Hilbert | B64C 1/20 244/118.1 |
| 2007/0205327 A1* | 9/2007 | Gioffre | B64D 47/08 244/118.1 |
| 2009/0014583 A1 | 1/2009 | Shelton | |
| 2012/0156909 A1* | 6/2012 | Tyler | H01R 13/6315 439/259 |
| 2014/0048653 A1 | 2/2014 | Thompson | |
| 2015/0217867 A1* | 8/2015 | Eccles | G03B 15/006 244/58 |
| 2015/0298807 A1* | 10/2015 | Chun | H01Q 1/28 244/137.4 |
| 2016/0223664 A1* | 8/2016 | Colantonio | B64D 7/00 |
| 2016/0323420 A1* | 11/2016 | Kutka | H04L 69/08 |
| 2017/0203842 A1 | 7/2017 | Viaud et al. | |
| 2017/0313421 A1 | 11/2017 | Gil | |
| 2018/0079482 A1* | 3/2018 | Ivans | B64C 1/00 |
| 2018/0273158 A1* | 9/2018 | Courtin | B64C 1/26 |
| 2018/0305005 A1 | 10/2018 | Parks | |
| 2020/0317324 A1* | 10/2020 | Youmans | B64C 27/20 |

OTHER PUBLICATIONS

Patent Cooperation Treaty Application No. PCT/US2018/057837, "International Search Report and the Written Opinion of the International Searching Authority", Applicant Elroy Air, Inc., dated Jan. 25, 2019.

Patent Cooperation Treaty Application No. PCT/US2018/057837, "International Preliminary Report on Patentability" Applicant Elroy Air, Inc., dated May 7, 2020.

Patent Cooperation Treaty Application No. PCT/US2018/067020, "International Search Report and the Written Opinion of the International Searching Authority", Applicant Elroy Air, Inc., dated Mar. 18, 2019.

Patent Cooperation Treaty Application No. PCT/US2020/027846, "International Search Report and Written Opinion of the International Searching Authority", Applicant Elroy Air, Inc., dated Sep. 23, 2020.

* cited by examiner

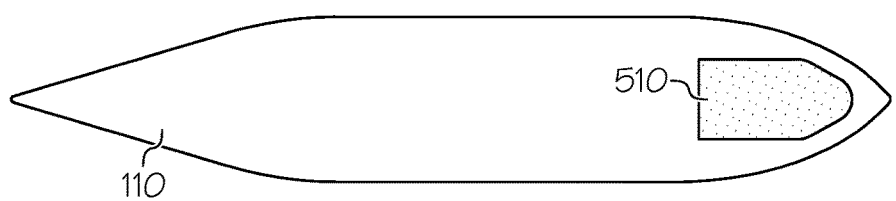
FIG. 13A1
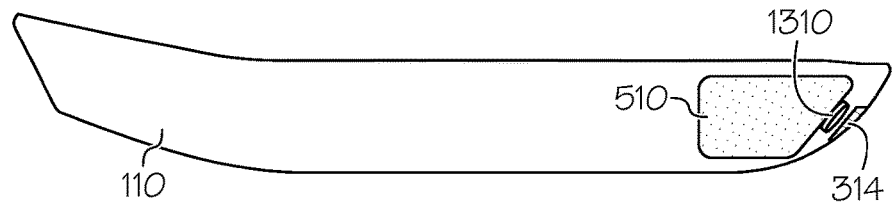
FIG. 13A2
FIG. 13A3
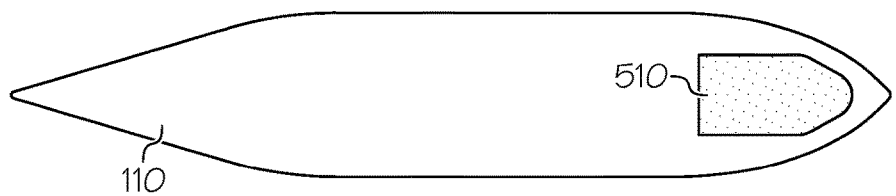
FIG. 13B1
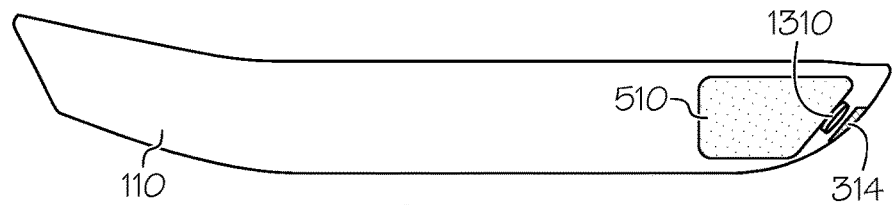
FIG. 13B2
FIG. 13B3
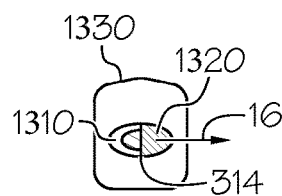
FIG. 13C

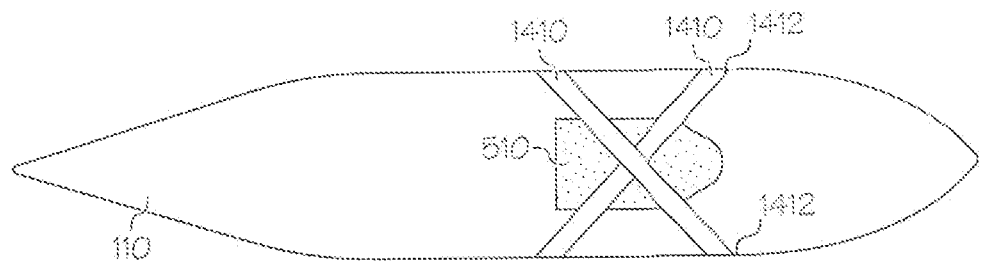
FIG. 14A1
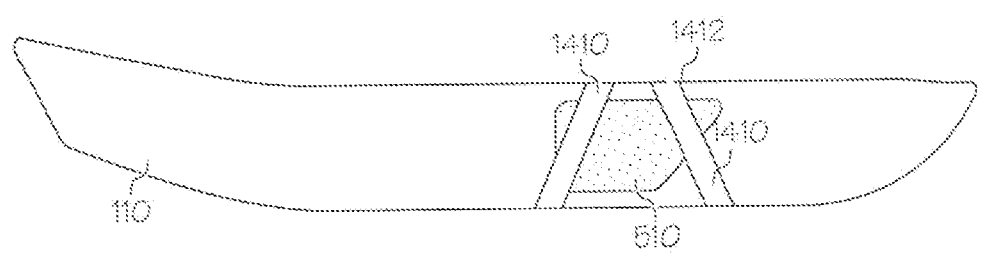
FIG. 14A2
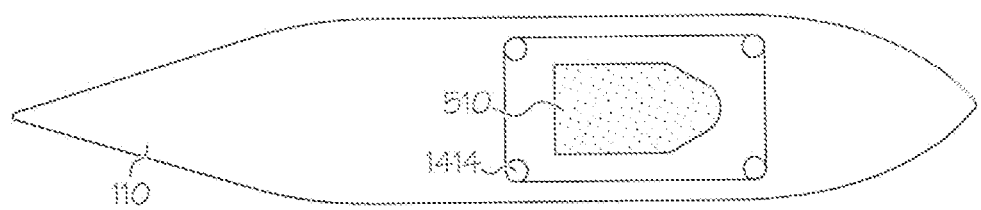
FIG. 14B1
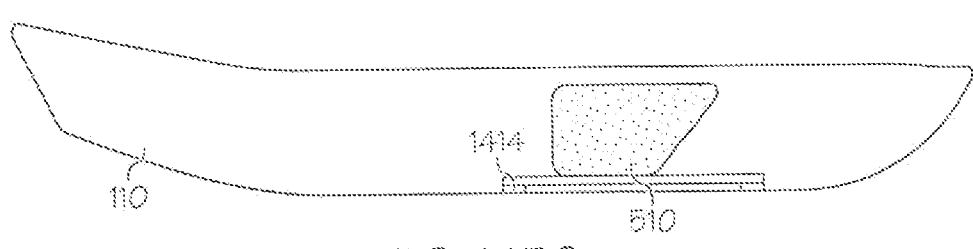
FIG. 14B2

MISSION POD FOR UNATTENDED UAV OPERATIONS

RELATED APPLICATION

This application claims priority to U.S. Provisional Application No. 62/914,810, filed Oct. 14, 2019, and has specification that builds upon U.S. Provisional Application No. 62/915,300, filed Oct. 15, 2019, the disclosures of which are hereby incorporated herein by reference in their entirety.

BACKGROUND

Field of the Invention

The present invention relates to systems and methods for unattended mating, release, and exchange between an unmanned aerial vehicle ("UAV") and external mission pods, wherein the pods may be configured to perform different missions.

Relevant Background

UAVs, often referred to as drones, are well-suited to applications where a traditional manned aircraft could be used but the physical presence of a human operator or pilot is undesirable. For example, in circumstances where a human operator would face risks that cannot be mitigated, such as flight in poor weather conditions or in the presence of ground hazards such as radiation or toxic emissions, it is advantageous to use an autonomous or semi-autonomous vehicle. One particularly critical factor is pilot exhaustion or boredom where, during a long flight in relatively repetitive conditions, a human operator may become fatigued and fall asleep; single pilot night flight using an autopilot aid is found to be particularly risky due to the pilot's loss of situational awareness and is a significant cause of accident.

For these reasons, UAVs are often used by governmental organizations for several different missions previously performed by manned aircraft, to include cargo transport; supplemental power storage, intelligence, surveillance and reconnaissance ("ISR"); command and control operations; and global strike missions. Today, there are hundreds of different models of UAV for performing these different missions, including over a hundred models for accomplishing ISR missions alone. Some of these models are small enough to be carried by a single person and are unsuitable for carrying heavy cargo or equipment. However, there is a demand for UAV systems with increased carrying capacity. For example, the US military recently sought development of a UAV that could carry a LiDAR system having a diameter of 18-21 inches and weighing 200-300 pounds.

Many larger models of UAVs are expensive, costing in the hundreds of millions of dollars, and are typically adapted for specific missions. For example, most large UAVs used for ISR carry the necessary equipment in their fuselage, which makes it difficult to adapt them for other functions. Some of these disadvantages can be mitigated by the use of a removably attachable pod. As used herein, a pod is a volume for carrying a payload that is mounted externally to an aerial vehicle's fuselage and is often aerodynamically shaped to reduce drag. Use of such pods allows the aerial vehicle to have a smaller fuselage, which increases the structural efficiency of the aerial vehicle by reducing its enclosed volume. When the aerial vehicle is not flying an operational mission, a pod can be omitted, promoting more efficient flights due to lower weight and smaller cross-sectional area. Further, the use of a pod with an aerial vehicle improves the system's modularity and flexibility, i.e., a single fuselage is rendered compatible with many types of mission, as well as the use of diverse equipment types for similar missions.

Unfortunately, even where large UAVs feature an external pod for housing mission equipment, existing pods and their connectivity to the UAV are purpose-built for a single mission, typically ISR, and cannot be easily re-purposed for other applications. What is more, existing systems and methods for installing and removing mission pods onto compatible UAVs require intensive involvement from ground crew, limiting the usefulness of such systems in forward deployed locations.

It is apparent that a need exists for a less expensive, robust, and standardized method of using a UAV to conduct a diverse set of missions. These and other deficiencies of the prior art are addressed by one or more embodiments of the disclosed invention. Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out hereafter.

BRIEF DESCRIPTION OF THE DRAWINGS

Features and objects of the present invention and the manner of attaining them will become more apparent, and the invention itself will be best understood, by reference to the following description of one or more embodiments taken in conjunction with the accompanying drawings and figures imbedded in the text below and attached following this description.

FIGS. 14(A1-A2), and 14(B1-B2) depict embodiments of mechanisms for securing third-party mission equipment in the mission pod.

Figure 1:
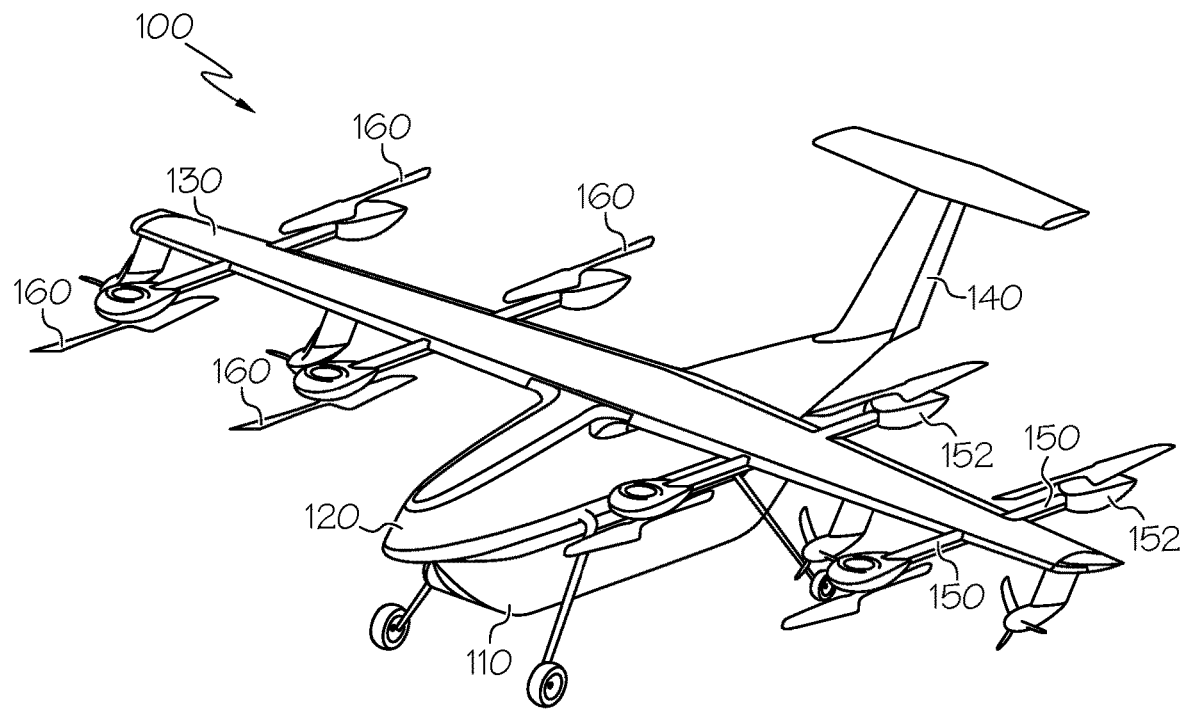
FIG. 1 depicts a front left quadrant view of a vertical take-off and landing ("VTOL") UAV for use with a mission pod.

The FIGURES depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A UAV mission pod and accompanying systems and methods for the unattended or minimally attended performance of a diverse set of missions is hereafter described. The disclosed mission pod having means for communication between the pod and UAV, mechanisms for securely attaching the pod to the UAV without the intervention of ground crew, mechanisms for facilitating power, fuel, and/or data transfer between the pod and UAV, means for securing various mission components within the pod, and external configurations supporting various sensing modalities and other mission requirements.

The present invention will now be described in detail with reference to several embodiments thereof as illustrated in the accompanying Figures. In the following description, numerous specific details are set forth in order to provide a thorough understanding of embodiments of the present invention. It will be apparent, however, to one skilled in the art that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

UAV and Mission Pod

Collectively, patent application U.S. Ser. No. 16/172,470 ("Compound Multi-Copter Aircraft") and U.S. Ser. No. 16/227,400 ("Unmanned Vehicle Cargo Handling and Carrying System") disclose UAVs for transporting a cargo payload, and are incorporated by reference herein. The disclosed invention concerns systems and methods for adapting a UAV cargo pod for other missions. In particular, the invention provides mechanisms, systems, and methods for securing varied mission components, external features that support the mission, e.g., windows for surveillance, collection, or emission, and facilitating unattended mounting between the UAV and pod.

Figure 2:
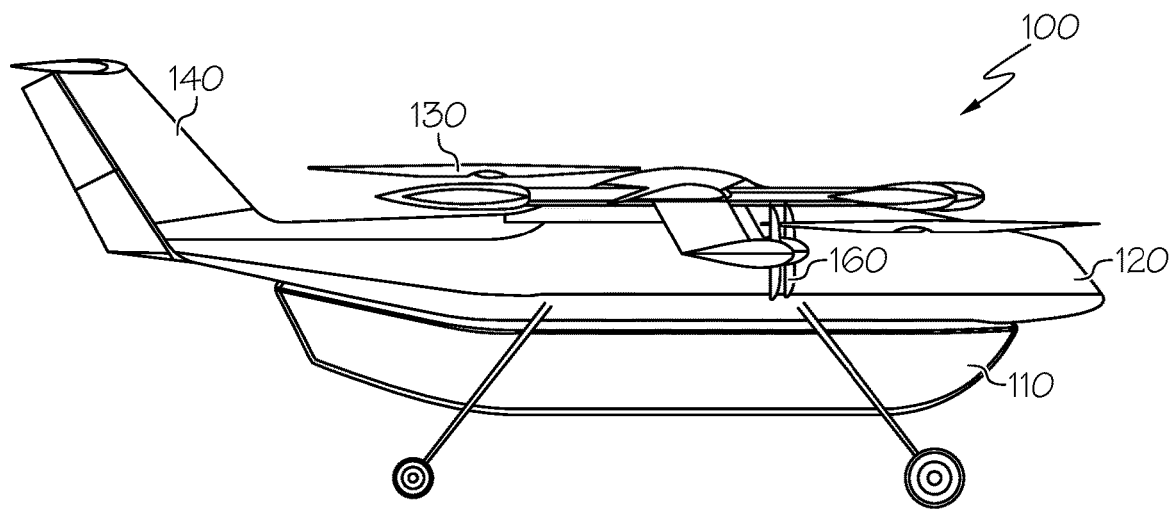
FIG. 2 depicts a right-side view of a VTOL UAV for use with a mission pod.

With reference to FIGS. 1 and 2, a VTOL UAV with mission pod is depicted. The UAV 100 includes a fuselage 120, wing 130, T-tail 140, propellers 160, and mission pod 110. U.S. 62/832,710, incorporated by reference herein, describes various embodiments of pod 110, and U.S. Ser. No. 16/227,400 discloses means by which fuselage 120 aligns with, attaches to, and detaches from pod 110.

FIG. 1 illustrates four booms 150 attached to wing 130, two on either side of the fuselage 120, with two motor pods 152 attached to each end of the four booms 150. Each motor pod 152 includes a motor and a rotor. The motor pods 152 enable the VTOL functionality of the UAV. In one embodiment, the fuselage of the UAV contains electrical power storage in the form of batteries, electronic equipment such as computing and battery management systems, and fuel used to power an internal combustion engine, which is equipped with a propeller to produce forward thrust, and a generator to supply electrical power for use by vertical thrusters.

Instead of having interchangeable mission pod 110, the UAV could be fitted with a standard aircraft pod, such as the U.S. military's "AgilePod," which is equipped to carry ISR equipment. However, use of the UAV with a standard pod would require the use of an adapter, preferentially one configured to work with a grasper-type crane, as described in U.S. Ser. No. 16/227,400 ("Unmanned Vehicle Cargo Handling and Carrying System"). Further, since existing pods are usually purpose-built for their specific mission, conducting diverse missions with the UAV will require use of different pods, each of which will likely have its own compatibility issues with the UAV. The use of existing pods, therefore, would make changing missions more difficult, and require intervention from ground crews to reconfigure the UAV or pod. Additionally, existing pods retain features unnecessary for UAV use, such as the ability to withstand supersonic flight speeds. Such unnecessary features degrade the mission capabilities of the UAV, such as by increasing pod weight, increasing power consumption, reducing available space, and so on. Therefore, a key to the disclosed invention is use of a mission pod or container that can accommodate diverse missions, or that can be readily repurposed for ISR, cargo, command and control, or global strike missions.

Figure 3:
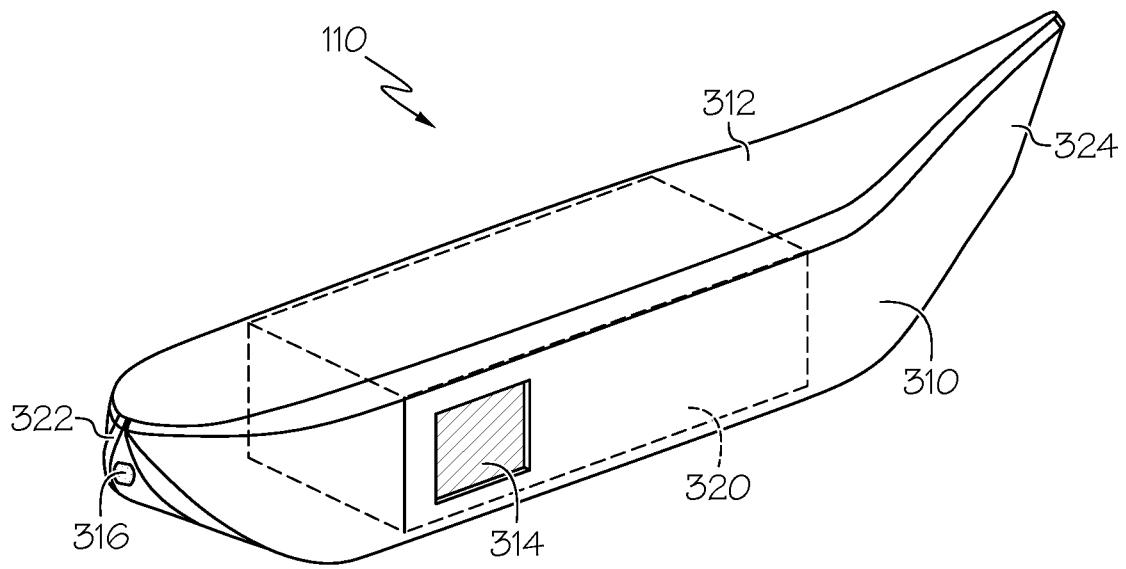
FIG. 3 depicts a front left quadrant view of a mission pod.
Figure 4:
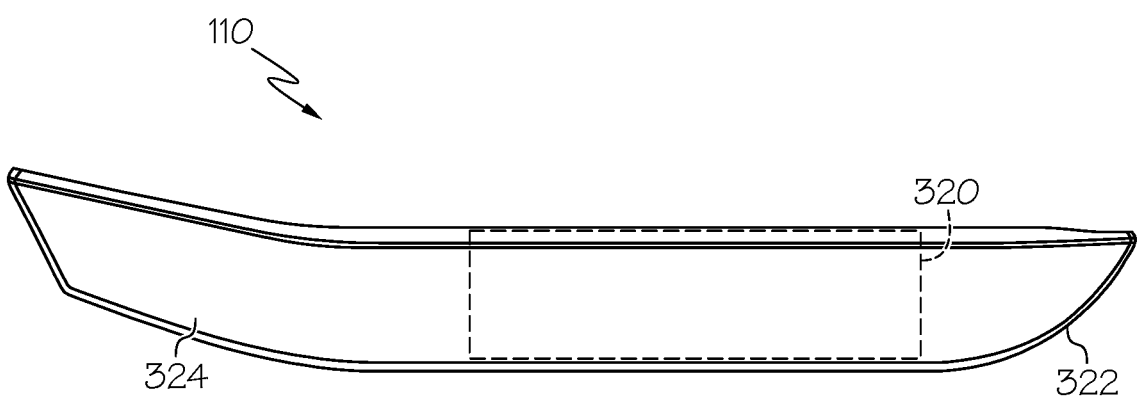
FIG. 4 depicts a right-side view of a mission pod.

Accordingly, with reference to FIGS. 3 and 4, the disclosed invention includes the mission container or pod 110 that a UAV is configured to carry. As described in U.S. 62/832,710 ("Aerial Cargo Container"), the container is substantially rectangular in shape, with either an open top (not shown) or a closed top 312, and is configured to be coupled to or decoupled from the underside of the UAV fuselage, as described in U.S. Ser. No. 16/227,400 ("Unmanned Vehicle Cargo Handling and Carrying System").

The pod includes an outer shell 310, which may be configured in various ways to facilitate a specific mission type. For example, the outer shell may be solid and composed of carbon fiber, fiberglass, quartz, or other suitable strong and lightweight materials. The shell may be hardened to withstand birdstrikes, and extremes in temperature and vibration. In some embodiments, the shell may include one or more actuatable sensing windows 314, panels that are transparent to one or more spectra of radiation 316, or inlets for cooling or power generation (not shown). The outer shell 310 houses a payload section 320, which is a portion of the pod interior that is stressed for bearing loads. A remaining portion of the pod includes a fore fairing 322, and an aft fairing 324, which provide an aerodynamic shape for the pod conformal with the lower UAV surface and provide additional space to house equipment.

The design of the pod 110 enables it to serve various purposes, including ISR missions, e.g., electronic surveillance, aerial photography and video, and target acquisition and tracking; cargo transport, e.g., commercial parcels, humanitarian aid and medical supplies, battlefield materiel, and removing wounded personnel from the field; supplemental power storage, e.g., fuel, battery power; command and control, e.g., radar location tracking, and multi-mode encrypted communications; and global strike missions, e.g., extended surveillance, and target identification.

Figure 5:
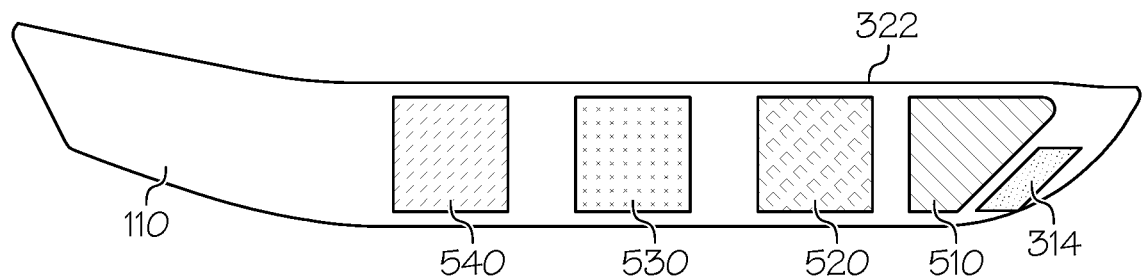
FIG. 5 depicts a mission pod of the disclosed invention configured for an ISR mission.

With reference to FIG. 5, the drawing depicts an embodiment of the mission pod configured for an ISR mission. The pod 110 holds four equipment categories needed for ISR: sensing means 510, power means 520, data processing and storage means 530, and communications means 540. The equipment categories are not necessarily depicted to scale relative to the pod size. Further, while the mission components are depicted in certain locations within the mission pod, they may be redistributed as required by weight and balance or other practical considerations. The mission pod 110 also includes a sensing window 314 located in the fore fairing 322, enabling the collector, e.g., sensing lens, of the sensing means 510 to collect its data. The sensing window is configured to allow the transit of one or more types of radiation that are actionable for the particular mission of the pod, e.g., visible light for video surveillance, infrared light for target tracking, radio waves for radar mapping, etc.

In an embodiment, sensing means 510 may comprise any devices and/or technology capable of reading or collecting data from the environment, including electro-optical video, infrared video, electro-optical motion indication, infrared motion indication, LiDAR, radar, synthetic aperture radar, terrain mapping radar, foliage penetration radar, radiation detection, spatial imaging, multi-spectrum infrared, ultraviolet light, hyperspectral imaging, signals collection, communication collection, microwave imaging, and other data collection means.

With further reference to FIG. 5, in an embodiment, power means 520 comprises any system capable of providing electrical power to the sensing means 510, data processing and storage means 530, and communications means 540. Such systems include batteries, an engine with electrical generator, a ram jet power generator, and a volume of fuel. In some embodiments, power means 520 generates power itself; in other embodiments, power means 520 receives and/or stores electrical power from the UAV's power systems.

In an embodiment, data processing and storage means 530 comprises computing systems known in the art. As an example, data processing and storage means 530 could be programmed to alter the path of the UAV based on the content received by the data processing and storage means 530 from sensing means 510. In this way, the UAV could be provided an initial goal or set of goals at the start of the mission, and dynamically and iteratively adapt its path according to the interplay between these two systems.

In an embodiment, data captured by the sensing means 510 is analyzed automatically in real-time to recognize patterns or occurrences of interest via the use of algorithms running on the data processing and storage means 530. These patterns could be pre-specified as part of the mission definition, for instance via the use of specific example data to be matched or via a training set of data collected in previous missions. A variety of state-of-the-art matching and detection algorithms could be executed on the data processing and storage means 530, such as feature-based computer vision methods or neural network-based methods.

In an embodiment, the data processing and storage means 530 provides a graphics processing unit (GPU) capable of accelerating the processing of image and video data to enable real-time image classification or object detection. Real-time classification or detection of objects in data collected by the sensing means 510 enables the UAV to automatically re-task itself based on the results of data analysis. This re-tasking could include behaviors such as loitering around a detected of object of interest and following and/or tracking an object of interest. The UAV could also be tasked to collect data from a variety of perspectives around the object of interest, for instance navigating to collect data from different lateral viewing angles or descending in altitude to collect data from a closer distance.

In an embodiment, communications means 540 transmits the output of the sensing means 510 to the operators of the UAV. This communication is accomplished wirelessly via several optionally-populated transceivers, including one or more of 802.11 (i.e., "WiFi"), cellular data networks (e.g., "3G", "4G/LTE", "5G", etc.), satellite communications (e.g., Iridium), point-to-point radio (RF) modems, mesh-networked radio (RF) modems, Bluetooth, and the like.

The ISR capable mission pod 110 can be configured in different ways, while preserving overall function. For example, the four components 510, 520, 530, 540 may each be an individual component with separate parts or systems, or two or more of them may be integrated into one device, as discussed below.

In the case of separate ISR components, power and data is transmitted among these components via power and data transmission lines and networking systems known in the art. For embodiments in which the sensing means 510 provides data directly to the UAV in real time, or near real time, the UAV (see below regarding this connection), through the pod's sensing means 510 could, for example, develop the ability to "see" through inclement weather via an imaging system that would not normally be aboard the vehicle. Because such systems represent additional significant weight penalties for the UAV, it may in some situations be preferable to house the sensing system in the mission pod, according to the disclosed invention.

In one embodiment, mission activities enabled by the mission pod are implemented in part by systems that are on board the UAV, and in other part by systems that are onboard the mission pod 110. Sharing the mission functions this way can lighten the weight of the pod 110, enabling a longer-range mission, or extended loitering capability. Each of the four components of ISR functionality can be accomplished (a) solely by the mission pod 110; (b) solely by the UAV 100; or (c) by a combination of mission pod capability and onboard UAV capability. FIGS. 6 through 10 illustrate alternative configurations of this shared functionality embodiment.

Figure 6:
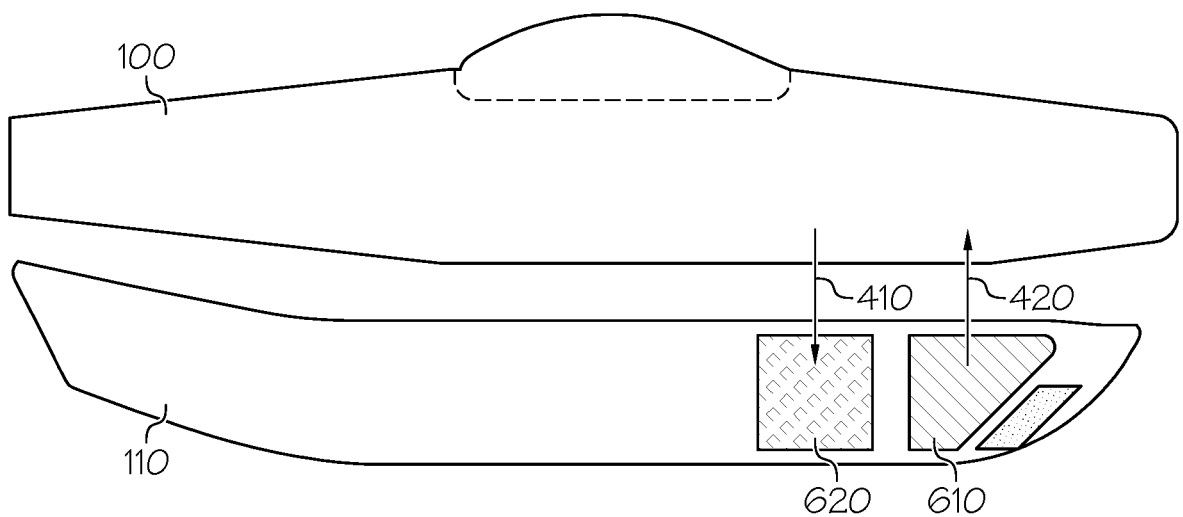
FIG. 6 depicts an embodiment of a first mission pod-UAV interaction.

FIG. 6 depicts an embodiment of a mission pod having a first pod-UAV interaction. In this first interaction, the mission pod 110 includes power means 620 and sensing means 610. The mission pod 110 receives power 410 from the UAV 100, and sensing means 610 sends data 420 to the UAV 100. The UAV then uses its onboard communications systems to transmit the data to operators.

Figure 7:
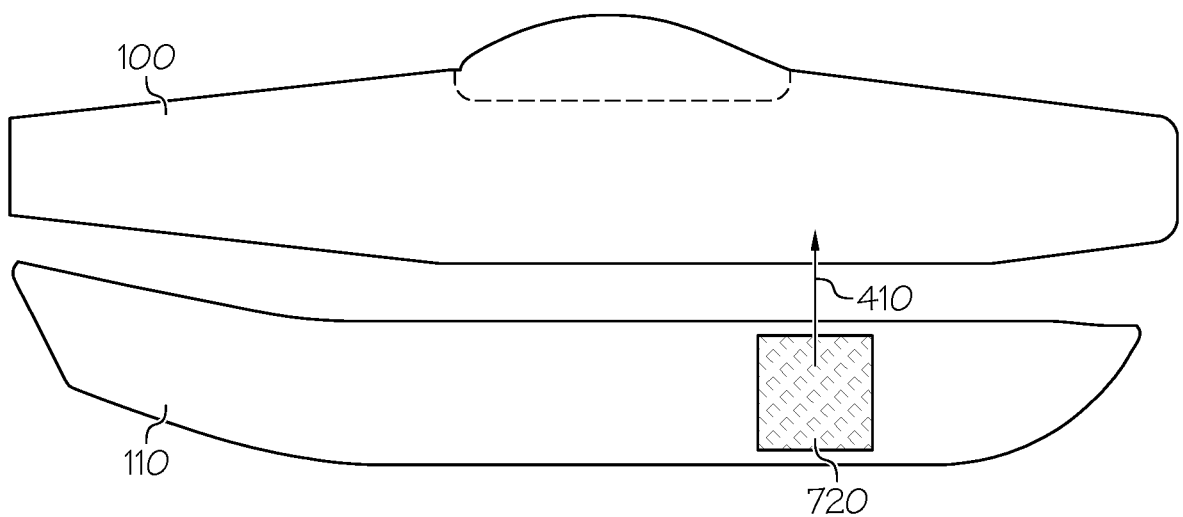
FIG. 7 depicts an embodiment of a second mission pod-UAV interaction

FIG. 7 depicts an embodiment of a mission pod having a second pod-UAV interaction. In this second interaction, the pod includes only power means 720, which serves as a source of secondary power 410 for the UAV 100 (for example, as discussed earlier, providing additional fuel or electrical power via a battery or fuel cell system or otherwise). This supplemental power serves to extend the range of the UAV 100.

Figure 8:
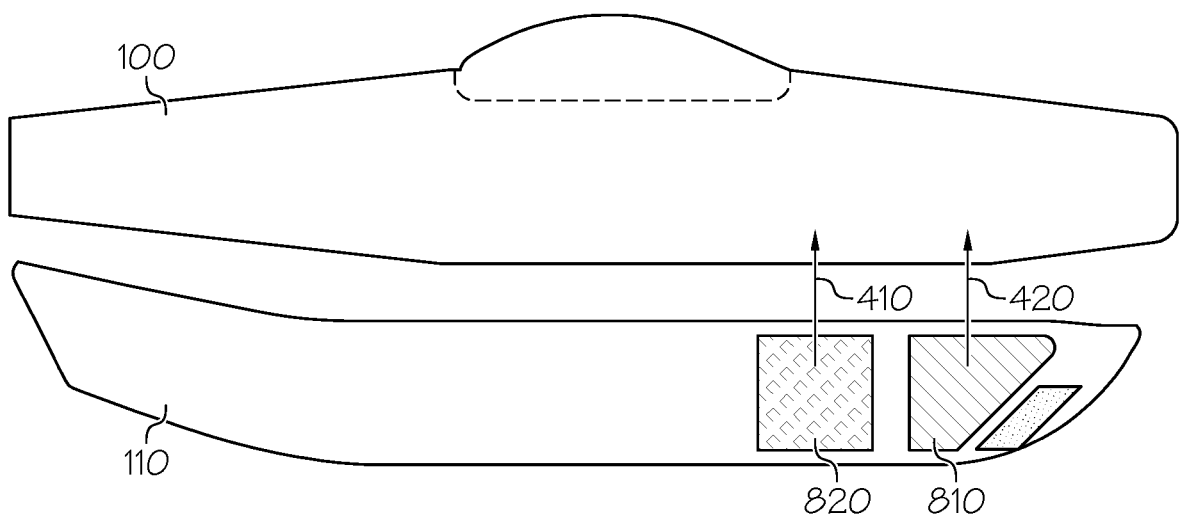
FIG. 8 depicts an embodiment of a third mission pod-UAV interaction.

FIG. 8 depicts an embodiment of a mission pod having a third pod-UAV interaction. In this third interaction, mission pod power means 820 serves as a source of secondary power 410 for the UAV 100 (extending the range of the UAV 100), and sensing means 810 provides its data 420 directly to the UAV 100.

Figure 9:
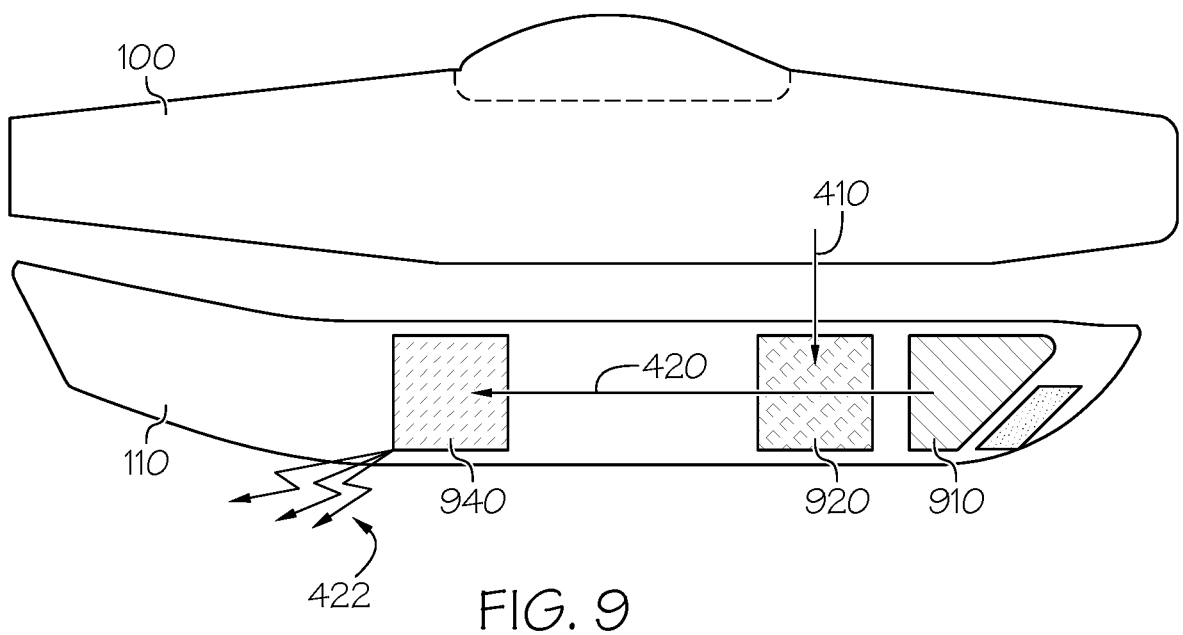
FIG. 9 depicts an embodiment of a fourth mission pod-UAV interaction.

FIG. 9 depicts an embodiment of a mission pod having a fourth pod-UAV interaction. In this fourth interaction, mission pod 110 receives power 410 from the UAV 100, and sensing means 910 delivers its data 420 directly to communications means 940, which transmits the data offboard 422 in real time for processing and utilization. In this way, an off-vehicle operator receives real-time or near-real-time data from the field of interest.

Regarding sharing the data between the mission pod 110 and UAV 100 (in either direction), this sharing can be accomplished by any means known in the art, including: (a) a wired connection, (b) a wireless connection, (c) an optical connection. Optical communication means may include fiber-optic signal transmission that runs through a cable, and non-cable proximity-based optical transmission. For example, proximity-based optical transmission is used in some embodiments to assist alignment between the attachment points on the UAV fuselage 120 and attachment points on the mission pod.

Regarding transmission of the sensing data, the mission pod-UAV interaction can assume any combination, including (a) the mission pod 110 passes data to the UAV 100 and the UAV transmits the data to an operator; (b) the mission pod 110 directly transmits the data to the operator; (c) each of the mission pod 110 and the UAV 100 transmit a portion of the data to the operator.

Regarding power to drive the equipment configured in the mission pod 110, this power can be sourced from: (a) solely the mission pod 110; (b) solely the UAV 100; or (c) a combination of the two. As noted earlier, for some embodiments in which power is sourced from the mission pod 110, some of that power can be used by the UAV 100 to extend its range or loitering duration.

Figure 10:
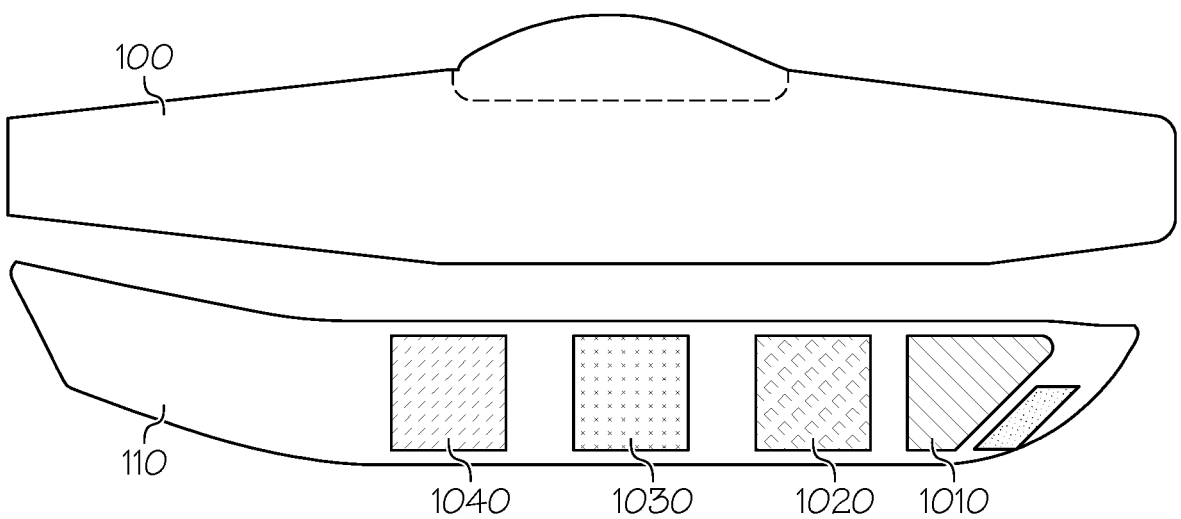
FIG. 10 depicts an embodiment of a fifth mission pod-UAV interaction, wherein the mission pod functions independently of the UAV systems.

In another embodiment shown in FIG. 10, the mission pod 110 performs all of the mission functions independent of the UAV's onboard systems. That is, the mission pod components perform all of the sensing 1010, power 1020, data processing and storage 1030, and communications 1040 functions. This embodiment is advantageous in that it enables any aircraft capable of carrying the disclosed mission pod 110 to do so without having the mission necessary power, communications, sensing, data processing and storage, or other mission specific capability. This means that aside from attaching and detaching mission pod 110, as described in U.S. Ser. No. 16/227,400, the UAV 100 needs to provide no other connections to the contents of the mission pod 110.

This independent mission pod capability is particularly important in the mission pod repurposing systems and methods discussed below, wherein the mission-specific contents of the mission pod 110 can be replaced in the field by other mission-specific equipment, or cargo (e.g., injured soldiers). For example, the UAV could complete its ISR mission, the mission pod could automatically detach, and the UAV could taxi over to a MEDEVAC-configured mission pod equipped to safely carry a wounded soldier. The UAV and MEDEVAC mission pod would self-align, the pod would attach itself to the UAV, and the UAV would take off for its next location, as instructed by data loaded in the mission pod. In an alternative embodiment, a UAV could complete its ISR mission, and the mission pod could be reconfigured by removing all of the ISR-specific equipment to allow for cargo loading. The repurposed pod loaded with cargo would then be reattached to the UAV and the UAV could takeoff and deliver the cargo to its destination. In such embodiments wherein the mission pod 110 is independent of the aircraft carrying it, diverse missions can be flown by the same UAV, using interchangeable mission pods, or alternatively using mission pods that can be reconfigured for different mission types.

In addition, the independent mission pod embodiment allows complete third-party systems to be installed in the mission pod 110 and used with the UAV. For example, Collins Aerospace manufactures and sells complete ISR systems to the U.S. military, including the SYERS-2A, DB-110, and its most capable system, the MS-177. The MS-177 is relatively long and narrow in shape and weighs approximately 500 pounds. It could, however, fit in the disclosed mission pod 110, and be carried by the UAV.

Mission Pod to UAV Interface

The disclosed invention contemplates multiple alternative approaches for mating the mission pod to the UAV fuselage. These approaches share an overall structure of: (1) bringing the pod and aerial vehicle into rough initial orientation and alignment; (2) employing the grasping, winching, latching sequence as described in U.S. Ser. No. 16/227,400; and (3) establishing the connections required to transfer data, power and/or communications between the pod and UAV.

To enable rapid, unattended detachment, attachment and swapping of mission pods configured for different missions, the disclosed systems employs communication means between the mission pod and the UAV to achieve initial orientation and alignment. Such communication means may be a form of localized communication, such as wireless internet, cellular, optical communication, radio, or the use of ultra-wide band ("UWB") radio transceivers. Each mission pod may be configured with one or more identifier beacons that can be received by a UAV located in range of the communication. Such an identifier conveys a specific serial number for the beacon. The beacon, in turn, is associated with a physical location on the pod, and may identify the pod and contents of the pod. In some embodiments, the beacon may identify the mission configuration of the pod, the power status, precise location, or other information useful for matching the pod with an appropriate UAV and mission. Sensors on the aerial vehicle are configured to detect the beacon arrangement on the pod, and from such information can infer information about the pod, such as position, orientation relative to the aerial vehicle, and pod identification.

Figure 11A:
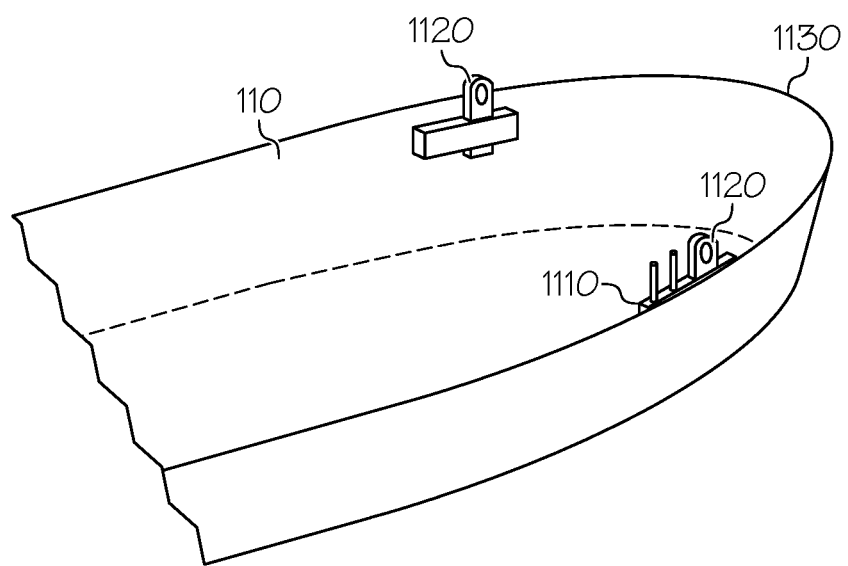
FIGS. 11(A), 11(B), and 11(C) are illustrations of an embodiment of connectors coupled to a latching system.
Figure 11B:
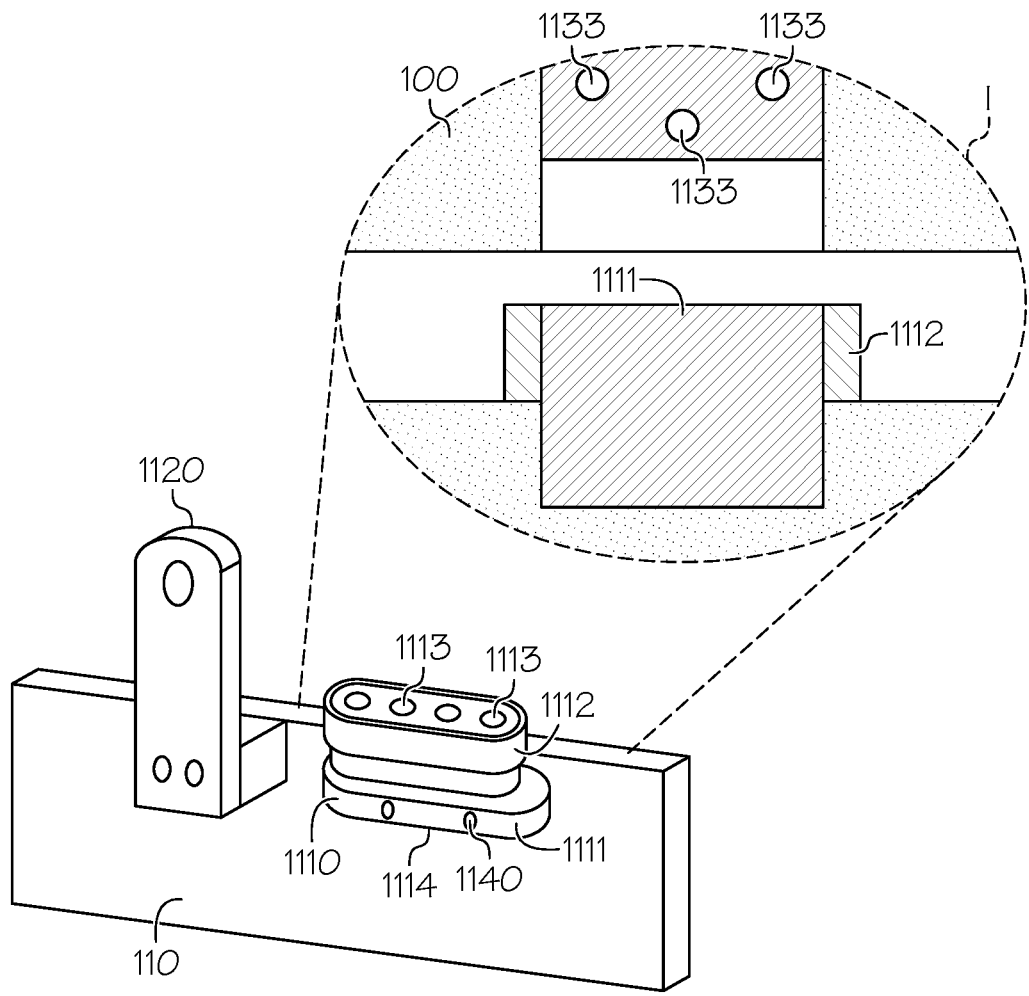
Figure 11C:
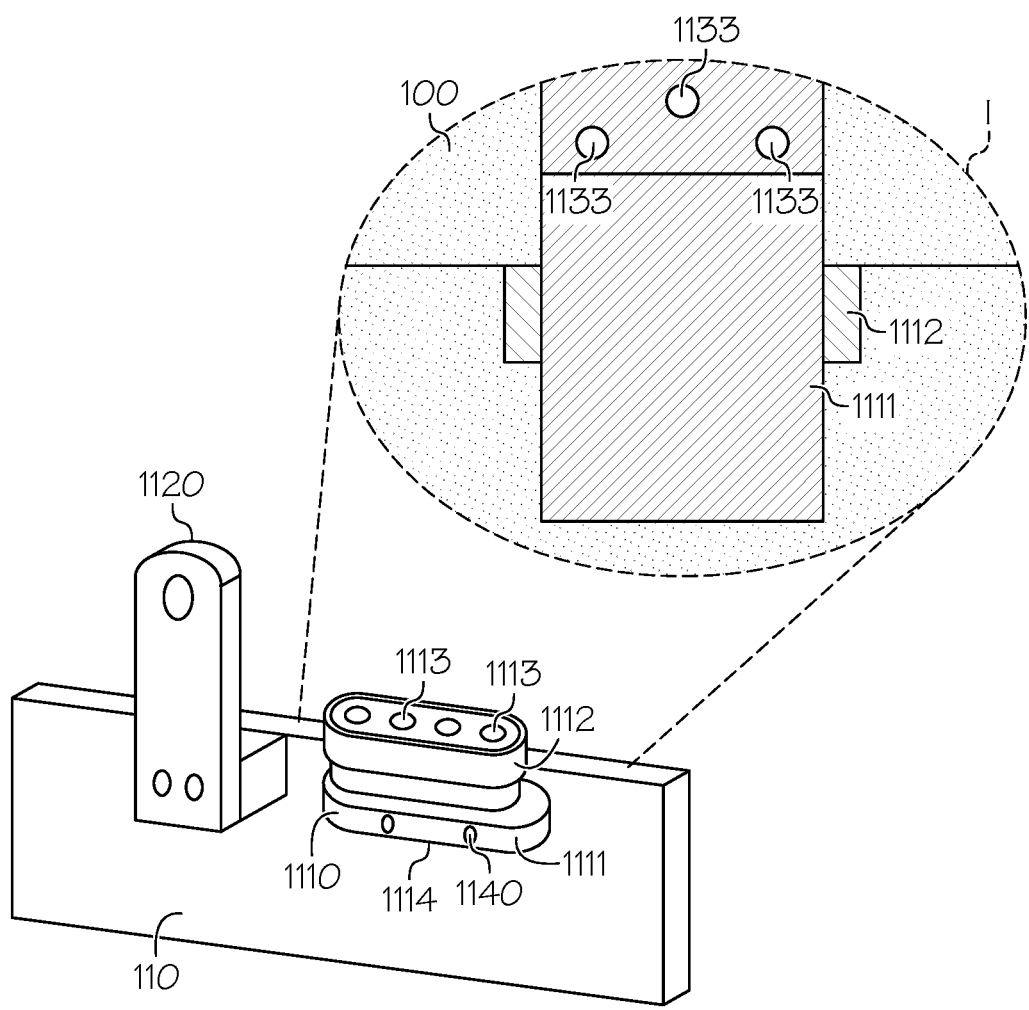

Once roughly aligned, the pod and aircraft are secured together by a plurality of latching mechanisms. FIGS. 11(A), 11(B), and 11(C) depict an embodiment of a latching mechanism 1120 mounted to the frame of mission pod 110 at the pod interface surface 1130. These latches 1120 have corresponding latching mechanisms (not shown) located on the lower surface of the fuselage of the aerial vehicle. FIG. 11(A) shows latches 1120 coupled to the frame of mission pod 110, and a data/power/communications connector 1110 on the right side of the mission pod 110 as viewed from outside the mission pod. Connector 1110 could also be coupled to the left side of mission pod 110, or at most points along the interface surface 1130, as long as the location aligned with corresponding connection structures on the aerial vehicle. Further, although this figure shows only one form of coupling, the disclosed invention contemplates any form that enables an automated connection during the mating process.

FIG. 11(B) shows the same arrangement as FIG. 11(A) from inside the mission pod 110. Further, this figure shows the configuration of connector 1110 before the UAV 100 has latched to the mission pod 110. From this perspective, the shielding mechanisms of connector 1110 are clearly seen. These shielding mechanisms include housing 1111 and sheath 1112, both of which protect the power/data/communications couplers 1113 from the automated graspers of the UAV, and from other potential sources of damage. The top of sheath 1112 is flush with the top of couplers 1113. This arrangement is seen even more clearly in the inset I, which depicts a magnified cross section of connector 1110. The inset I also shows corresponding power/data/communications UAV couplers 1133 of the UAV 100 that are poised to connect with the couplers of mission pod 110.

FIG. 11(B) also shows the location of one or more mission equipment power/data/communications conduit connection point(s) 1114. The connection point(s) 1114 are structures within the connector 1110 at which the pod interfaces with the data, power, and/or communications conduits of the pod's mission-specific payload. Connection point(s) 1114 include a cavity and standard port(s) for data, power, and/or communications in the bottom of housing 1111, as known in the art. Also depicted is the curved shape of housing 1111. The curved shape, together with the robust material out of which housing 1111 and sheath 1112 are made, further serve to protect couplers 1113 from being damaged during the mating process. Such suitable materials include metals, alloys, carbon fiber, composites, or plastics. Finally, FIG. 11(B) shows the connector 1110 secured to the shell of mission pod 110 with bolts through holes 1140 in the housing 1111. In an alternative embodiment, the connector 1110 is attached to the frame of mission pod 110 instead of its shell. In still another embodiment, the connector 1110 is attached to latch 1120.

FIG. 11(C) shows the same structure as FIG. 11(B) as configured post completion of the mating process between the UAV 100 and mission pod 110. In this view, the grasping crane of the UAV has grasped, aligned, and latched the mission pod 110 to the UAV fuselage. This action has caused the sheath 1112 of connector 1110 to retract, allowing the couplers 1113 to mate with the UAV couplers 1133. A magnified view of this interaction is depicted in the inset I. The mechanisms described above enable the pod to align and latch to the aerial vehicle, and also allow mission-specific payloads for different mission types to automatically establish data, communications, and/or power connections with the UAV 100. With multiple installations and de-installations of mission equipment in the mission pod 110, couplers 1113 enable this quickness, while housing 1111 and sheath 1112 provide a secure, robust connection.

The couplers described herein to facilitate the flow of electrical power, fuel, data, and/or communications between the mission pod and aerial vehicle include at least the following options: (a) self-sealing fuel connectors for power; (b) pogo style contactors for data; (c) "blind mate" connectors that insert during the latching, and/or (d) standard physical data and/or power connections performed by a human operator before or after the latching process. In addition, other suitable configurations are possible and contemplated. Like the mechanisms described with respect to FIG. 11, all of these configurations will accommodate the necessity of achieving precise alignment through the latching process prior to establishing additional connections. Attempts to establish power or other connections prior to alignment would likely interfere with the latching process, and/or cause damage to power or other connections. Therefore, some embodiments of the mating system may employ a staggered sequence for additional connections, in which latching occurs first, and then additional connections occur afterward. Temporally delayed power, data, and/or communications connections may comprise an additional step of a post-latching procedure, or latching and coupling mechanisms may include secondary alignment structures, e.g., short pins that establish contact only after the pod is in latching position, that would only be contacted in a final alignment stage of the latching sequence.

Figure 12:
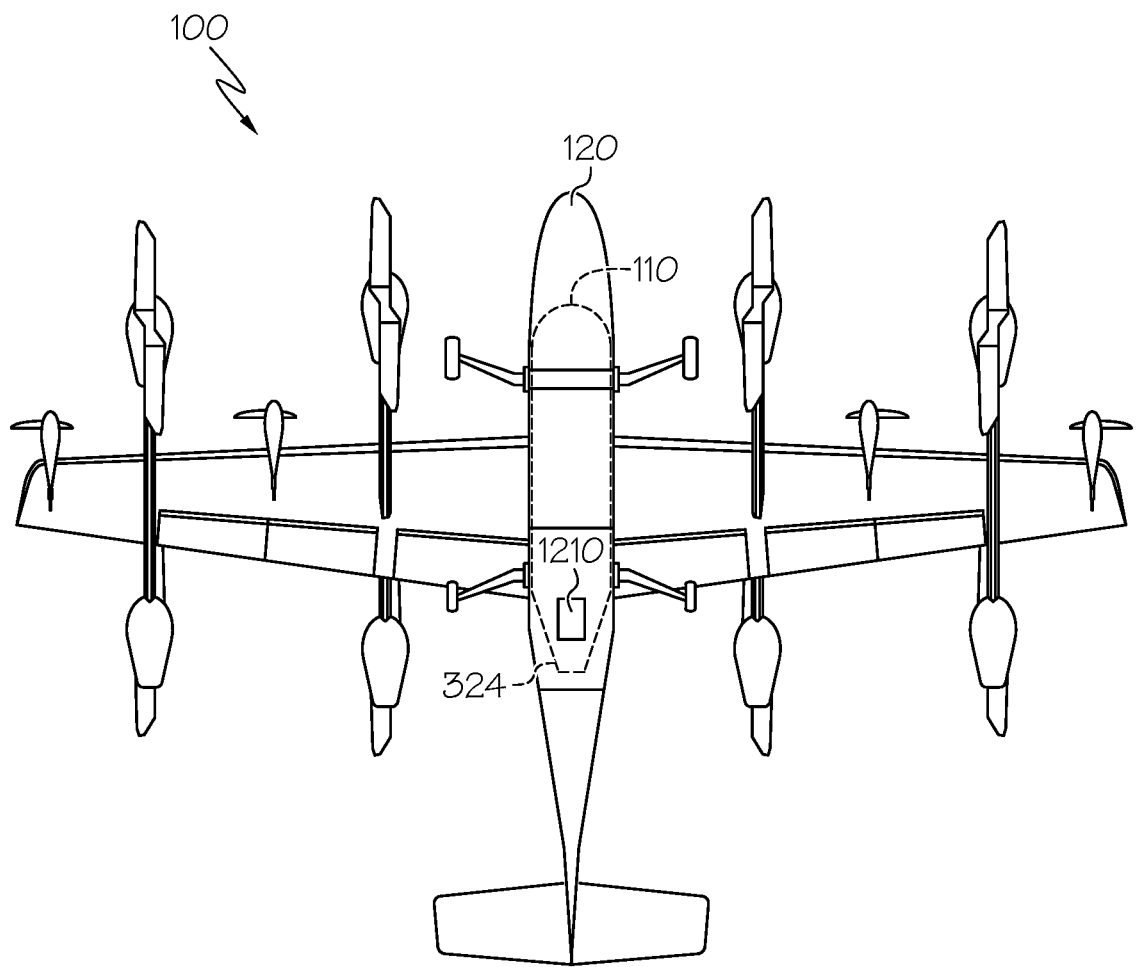
FIG. 12 depicts an embodiment of a data, power, and/or communications hatch in the mission pod.

With reference to FIG. 12, in some embodiments, the mission pod 110 may include an electrical, fuel, and/or data port connection hatch 1210 at the rear of the pod in the aft fairing section 324. The pod hatch corresponds to a hatch on the UAV fuselage 120, which covers corresponding connection ports within the UAV 100.

A particular advantage of the disclosed mating systems is that they are able to accommodate an initial state of mis-orientation and/or mis-translation between the mission pod and fuselage of the aerial vehicle. In other words, the aircraft does not have to locate itself relative to the pod with particular accuracy in order to successfully mate to the pod. For example, due to uncontrolled ground conditions such as climate or terrain surface, the aircraft may arrive over a pod that is only roughly aligned horizontally, and the plane of the pod interface surface may be angled with respect to the fuselage. Through the accompanying grasping, winching, latching sequence, the pod goes from a potential initial misalignment to being aligned and attached to the aircraft for flight. Once aligned, the pod and aircraft may then establish the electrical, power, fuel, and/or data connections as required by the particular mission.

An example of the disclosed mating system in operation features a UAV landing after a cargo mission. After roll-out, the aerial vehicle taxis back to the mission staging area, where its sensors detect a UWB beacon for an ISR-configured mission pod. The beacon conveys the ISR pod's identification number, mission configuration, payload, operational status, fuel load, weight, and/or precise location to the UAV. The UAV taxis its cargo pod to a designated detachment location and detaches from the cargo pod. The UAV then uses the ISR pod beacon information to taxi over to the pod and stop in the mating alignment location. The pod then initiates a latching procedure to securely attach to the UAV and connect power and data conduits between the pod and aerial vehicle. Once mated, the pod communicates wirelessly with the UAV, providing it a flight plan, mission objective, landing location, follow-on pod, and/or follow-on mission. The mission pod also establishes power, data processing and storage, and communication links with the UAV, as configured. The UAV then takes off for its ISR mission.

Figure 13D:
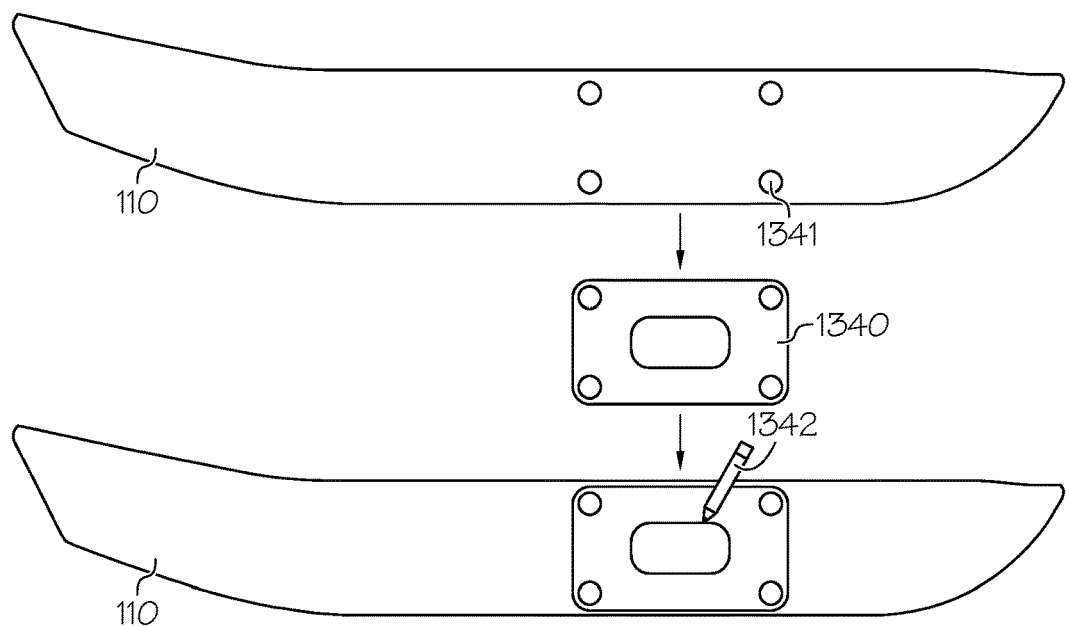
FIGS. 13(A1-A3), 13(B1-B3), 13(C), 13(D), 13(E), and 13(F) are illustrations of embodiments of a section of the mission pod enabling electro-magnetic or optical sensing.

FIGS. 13(A), 13(B), 13(C), 13(D), 13(E), and 13(F) are illustrations of embodiments of the mission pod configured for various sensing or signal transmission missions. While mission pod 110 is typically comprised of a visually opaque material, e.g., aluminum, alloys, fiberglass, carbon fiber, or polymers, such materials impede the functionality of some optical sensing means 510. Accordingly, FIG. 13(A) show sensing lens sensing window 314 comprising an opening in mission pod outer shell 310. Sensing means 510 is positioned with its optical sensing lens 1310 directly adjacent to the sensing window 314. FIGS. 13(A)(1), 13(A)(2), and 13(A)(3) show a top, side, and front view of mission pod 110, with the foregoing components indicated.

The sub-figures of FIG. 13(B) are the same as those for FIGS. 13(A), except that in FIGS. 13(B), the sensing window 314 comprises a solid panel, made of a largely optically transparent material, such as S-glass, which preserves the aerodynamic qualities of the mission pod.

FIG. 13(C) shows an embodiment of sensing window 314 including an actuatable cover apparatus. In this embodiment, sensing window 314 is still integral to mission pod 110, and now includes a sliding cover 1320. The sliding cover 1320 is made of similar material as mission pod 110 (e.g., carbon fiber). When sliding cover 1320 is closed, mission pod 110 appears contiguous. But when the cover 1320 is open, viewing section 314 is revealed (whether an opening or transmissible material), enabling proper function of the sensing means 510.

Figure 13E:
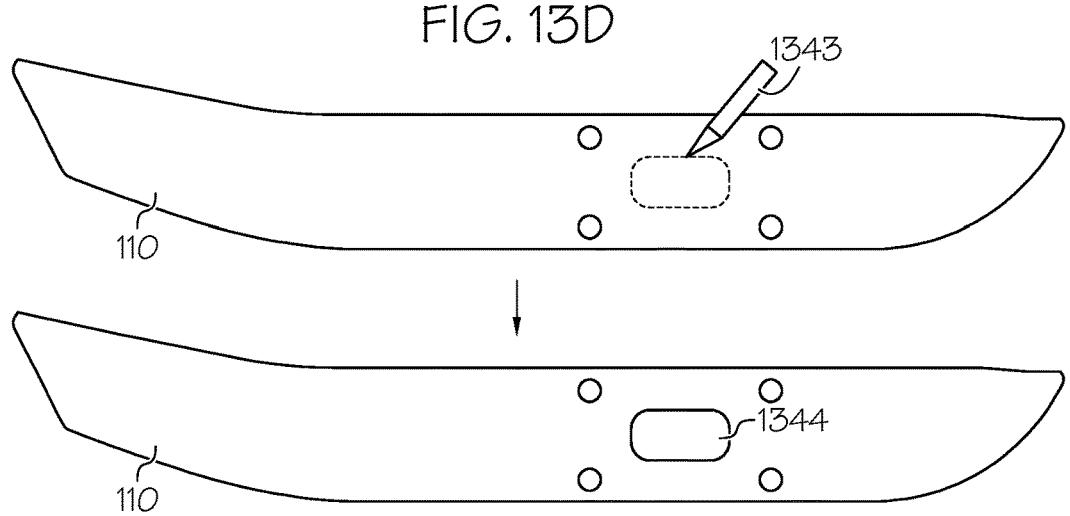
Figure 13F:
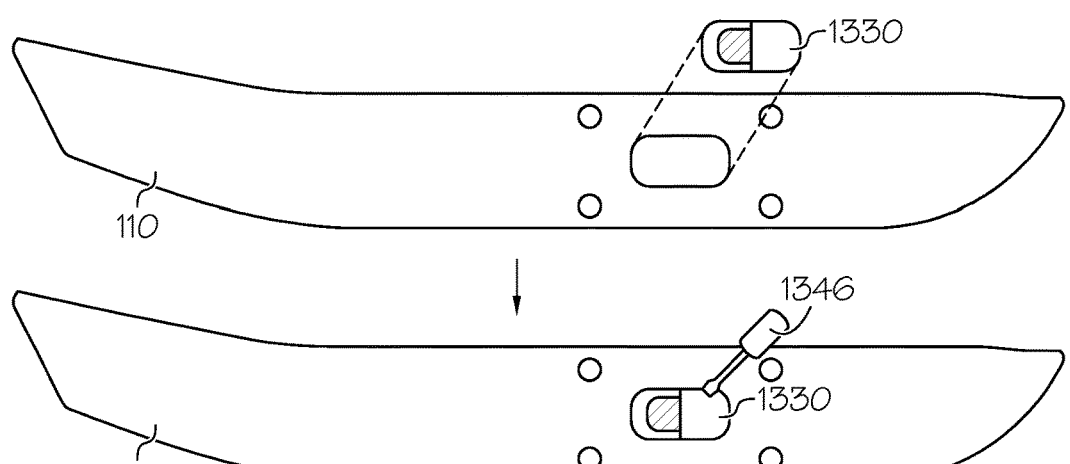

FIG. 13(C) also shows an alternative embodiment of the sensing window 314 as an installable part 1330. In embodiments in which third party ISR systems are used (e.g., the MS-177), and it is not known a priori where exactly the device will be placed inside mission pod 110, a more flexible approach is required for creating the one or more sensing areas 314. In this case, once the location of the third party's sensors are known, as shown in FIGS. 13(D), 13(E) and 13(F), one or more openings 1344 can be cut into the mission pod 110 using a cutting tool 1343. The opening 1344 can be cut out freehand, or it can be cut out as shown in FIG. 13(D) using template 1340 with template alignment markings 1341 on mission pod 110. Once the opening 1344 is cut, sensing window 1330 is mounted into the opening (FIG. 13(F)), and then this part is secured to the wall of mission pod 110 using securing mechanism 1346. Securing mechanism can be screws, adhesive, rivets, or any other securing method known in the art.

The foregoing method of installing sensing windows into mission pod 110 enables the disclosed mission pod to provide functionality across multiple mission types. First, it enables different mission equipment, from different manufacturers, with different locations of sensors or transmitters, to be installed in mission pod 110. Second, it enables rapid, forward deployed installation of the sensing window 1330, since the necessary equipment can be stored in mission pod 110 until required for use at the forward location.

FIGS. 14(A) and 14(B) are illustrations of embodiments of mechanisms for securing a payload such as third party ISR equipment in the mission pod. FIGS. 14(A)(1) and 14(B)(1) show a bottom view of the pod 110, while FIGS. 14(A)(2) and 14(B)(2) show a right-side view of the pod 110. FIG. 14(A) show straps 1410, the ends of which are attached to frame of mission pod 110 at attachment points 1412. These straps 1410 are tightened to hold firm the third party ISR equipment 510. FIG. 14(B) show the mission pod 110 frame having interface points 1414 to the grasping system of UAV 100, which holds the third party ISR equipment 510 firmly in place.

Figure 15:
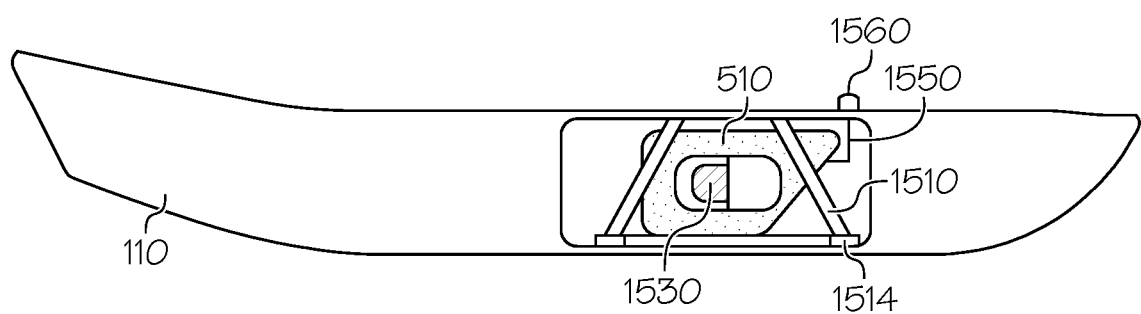
FIG. 15 depicts an embodiment of the disclosed invention with an MS-177 ISR system loaded in and secured within the mission pod.

With reference to FIG. 15, an embodiment of the disclosed invention is shown wherein the mission pod 110 is configured to carry, for example, a Collins Aerospace MS-177 system 510 for ISR missions. Physical securing mechanism 1510 holds the MS-177 510 secure to mission pod 110. The securing mechanism 1510 may interface with the pod 110 via attachment points 1512 as shown in FIG. 14(A), or may attach to interface points 1514. The optical sensing lens of MS-177 (not shown) is positioned against viewing section 1530, enabling its proper operation. The MS-177's power and/or data cable 1550 is connected to the power and/or data connector 1560 of mission pod 110. Once the UAV grasps and latches mission pod 110, a power and/or data connection is automatically established between the MS-177 and the UAV via the data connector 1560, as discussed above. Although this figure depicts the MS-177 as installed in mission pod 110, the disclosed invention contemplates the installation of any third party ISR product that can fit within the mission pod 110.

The preferred embodiments of the present invention addresses VTOL UAVs. However, alternative embodiments of the same invention apply equally to conventionally launched UAVs, as well as human-operated aircraft.

In sum, the present invention provides a system and methods for adapting a UAV cargo pod for use in a diversity of mission types, including ISR, command and control, and global strike. In particular, the invention provides systems and methods for unattended mission pod attachment, release and replacement, communication means between mission pods and the UAV, mechanisms for securing mission-necessary components within the pod and providing suitable windows to allow the transit of radiation that is actionable for various mission modalities.

While this invention has been described in terms of several embodiments, there are alterations, modifications, permutations, and substitute equivalents, which fall within the scope of this invention. Although subsection titles have been provided to aid in the description of the invention, these titles are merely illustrative and are not intended to limit the scope of the present invention. In addition, where claim limitations have been identified, for example, by a numeral or letter, they are not intended to imply any specific sequence.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

This has been a description of the disclosed invention along with a preferred method of practicing the invention, however the invention itself should only be defined by the appended claims.

What is claimed is:

1. A pod for aerial transport, comprising:
a shell configured to contain a payload within an internal space, wherein the payload comprises an Intelligence, Surveillance, and Reconnaissance (ISR) system, including a sensor configured to collect data, a data processor, a data storage device, and a power source;
a plurality of attachment points configured to secure the payload within the shell;
an identification beacon, the identification beacon configured to transmit a signal received by an aerial vehicle wherein the signal includes a physical location and orientation of the shell and the payload within the shell and wherein a sensor on the aerial vehicle is configured to detect the signal and receive the physical location and orientation of the shell relative to the aerial vehicle and position the aerial vehicle over the shell;
a latching mechanism configured to secure, unattended, the shell to the aerial vehicle;
an interface for interacting with the aerial vehicle, wherein the interface includes a plurality of connectors, wherein the plurality of connectors is configured to allow the transit of one or more of the following between the pod and the aerial vehicle: power, fuel, and data; and
a communication means for exchanging information between the pod and the aerial vehicle and wherein the data processor and data storage device autonomously forms a re-tasking that re-tasks the aerial vehicle based on analysis of data collected by the sensor, the re-tasking communicated to the aerial vehicle through the communication means.

2. The pod of claim 1, wherein the shell further comprises one or more windows configured to allow actionable radiation to transit the shell.

3. The pod of claim 2, wherein the one or more windows is configured to allow the transit of one of the following forms of actionable radiation: visible light, ultraviolet light, infrared light, microwaves, radio waves, hyperspectral radiation, electro-magnetic radiation.

4. The pod of claim 2, wherein the one or more windows further comprises a cover having a closed configuration and an open configuration, wherein in the closed configuration the cover is positioned to provide an aerodynamic surface over the window, and wherein in the open configuration, the cover is positioned to allow transit of actionable radiation.

5. The pod of claim 2 wherein the one or more windows comprises an installed panel, wherein installation comprises using a template to cut an opening in the shell, and securing the panel with securing means.

6. The pod of claim 1, wherein the internal space further comprises an aft fairing space, a fore fairing space, and a payload space.

7. The pod of claim 1, wherein the ISR system comprises the following functions: sensing, data processing and storage, power, and communications.

8. The pod of claim 1, wherein the plurality of attachment points comprises one or more of the following: a tie down, a bolt, a locking pin, a clip, a hard point, and an interface point.

9. The pod of claim 1, wherein the communication means includes one of the following: an ultra-wide band radio, a radio beacon, a wireless transceiver, a cellular transceiver, a radio transceiver, an optical transceiver.

10. The pod of claim 1, wherein the plurality of connectors is configured to automatically mate the pod to the aerial vehicle when the pod and aerial vehicle are in the aligned orientation.

11. The pod of claim 1, further comprising a shield configured to protect one or more of the plurality of the connectors from damage during a mating sequence.

12. The pod of claim 11, wherein the shield is a sheath configured to allow the mating sequence to proceed only when the plurality of connectors is aligned with a plurality of corresponding connectors on the aerial vehicle.

13. The pod of claim 1, wherein the plurality of connectors includes at least one connector located in an aft fairing section of the pod corresponding to a latch located on the aerial vehicle.

* * * * *